United States Patent Office 2,939,282
Patented June 7, 1960

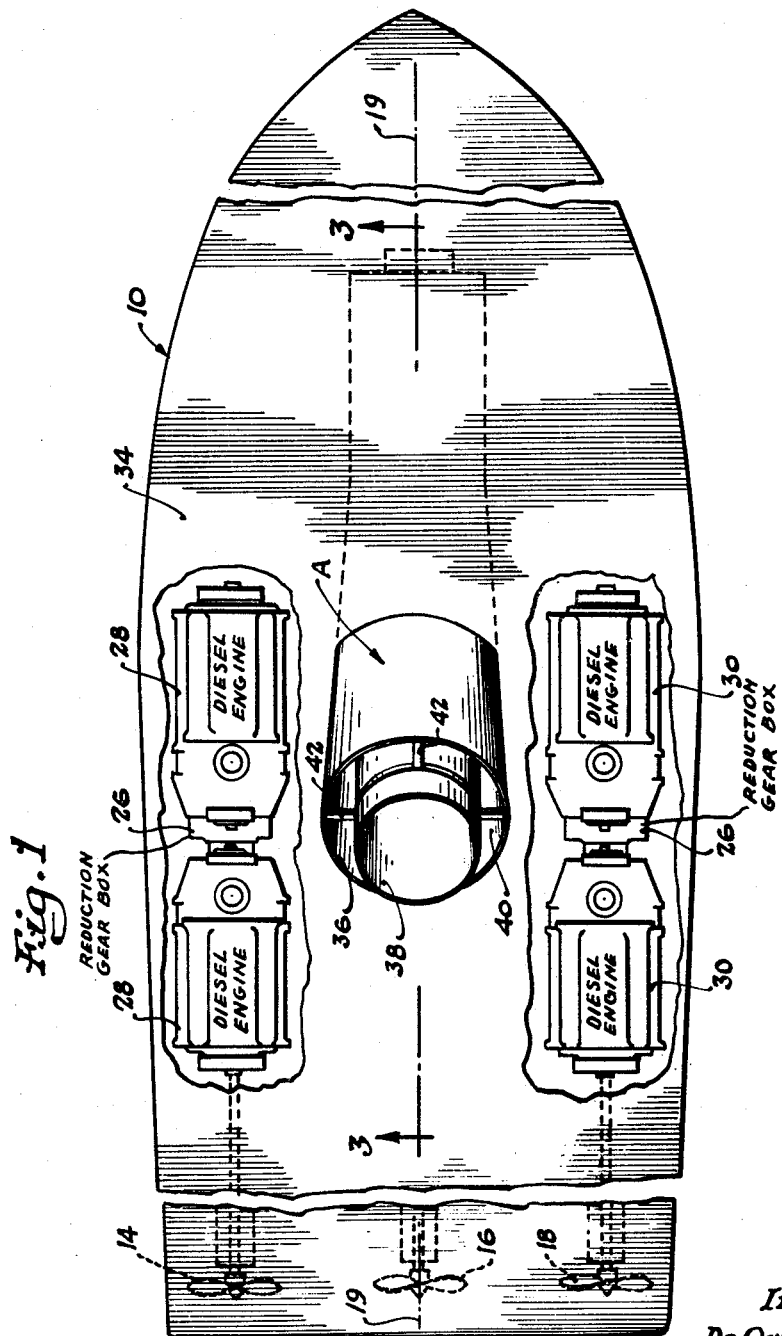

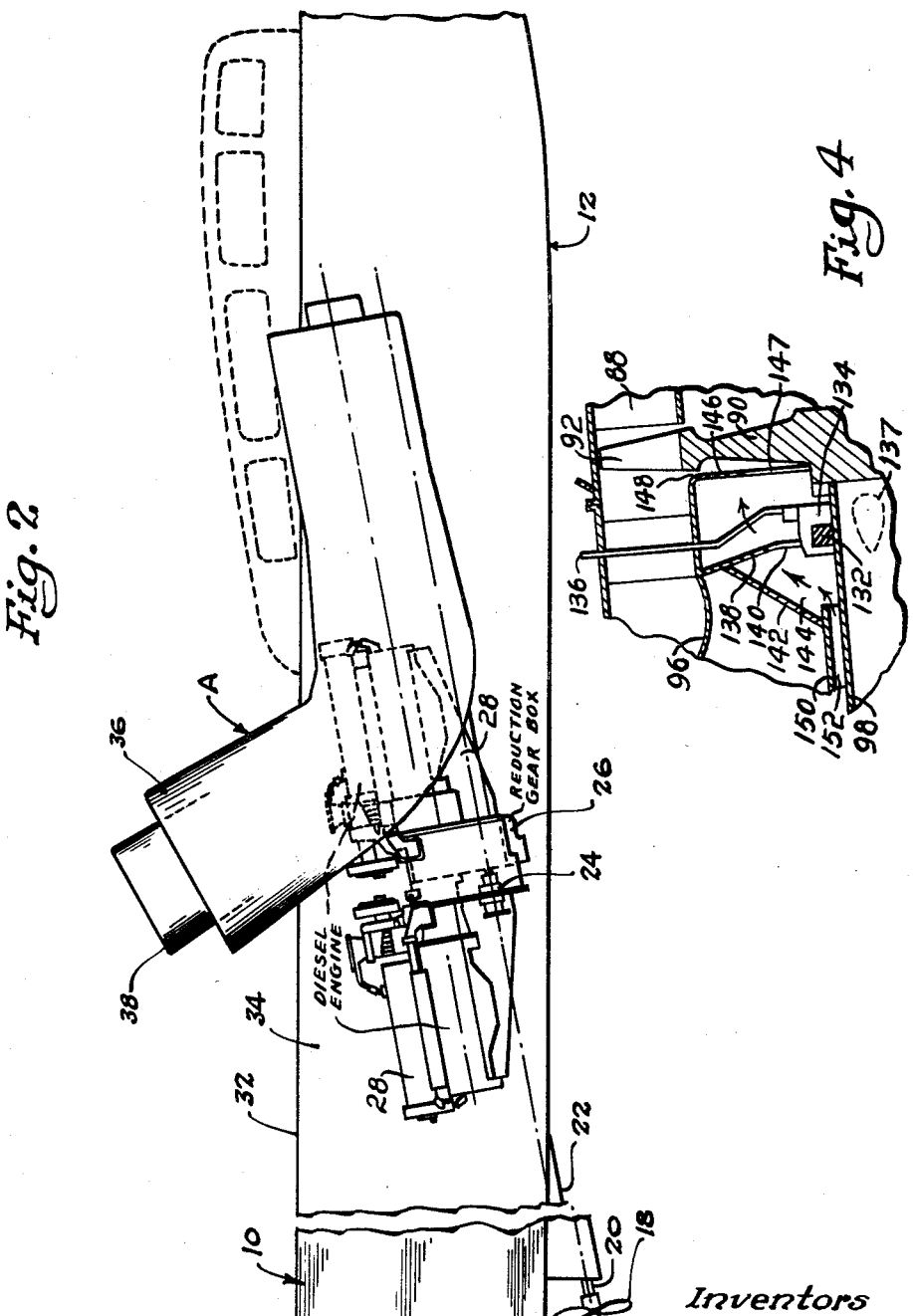

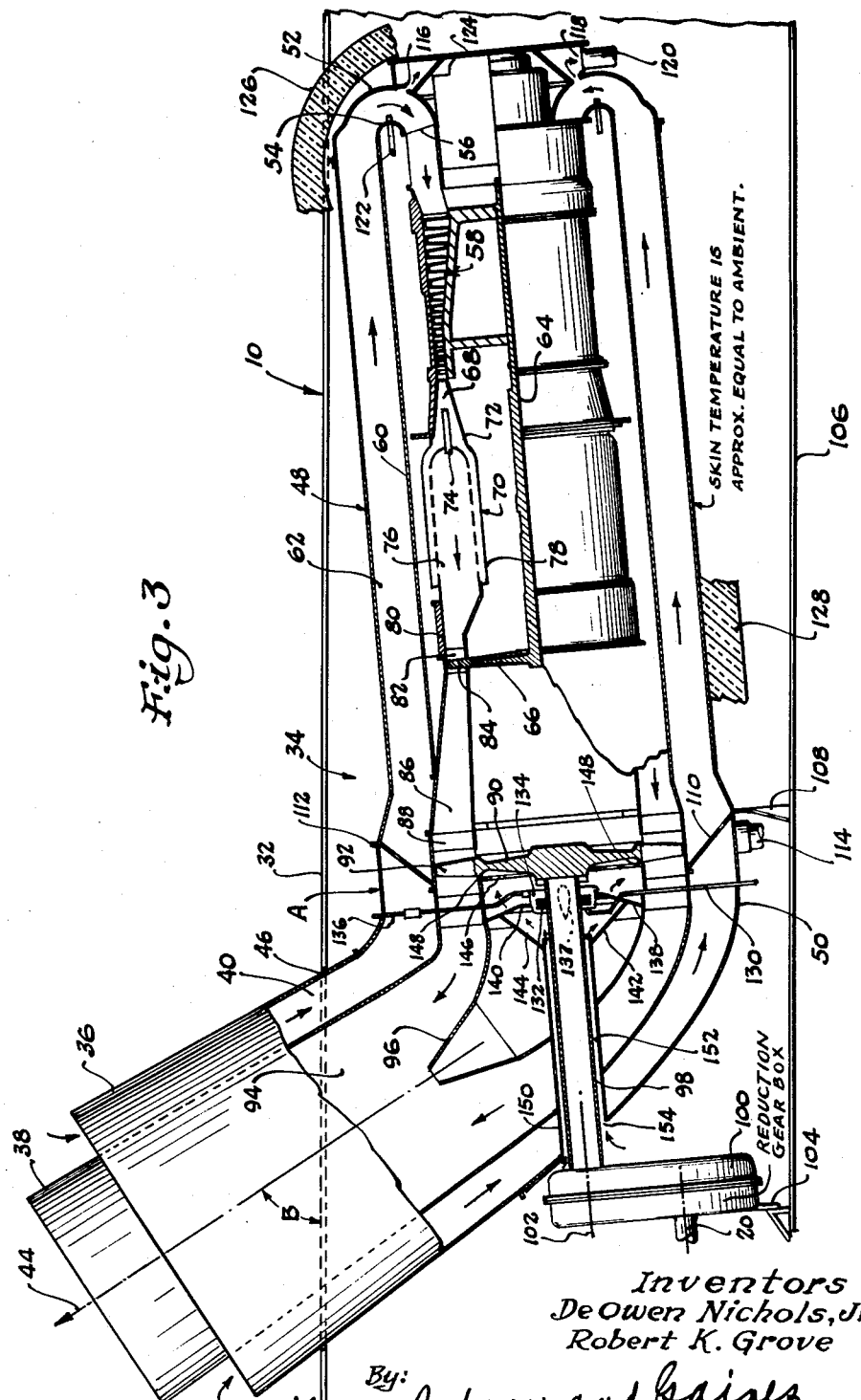

2,939,282

INTAKE AND EXHAUST DUCTING FOR GAS TURBINE ENGINE

De Owen Nichols, Jr., Birmingham, and Robert K. Grove, Grosse Pointe Farms, Mich., assignors to Studebaker-Packard Corporation, a corporation of Michigan Filed Apr. 7, 1954, Ser. No. 421,472

6 Claims. (Cl. 60—39.66)

The present application relates to gas turbine machinery, particularly to a gas turbine adapted for usage in marine propulsion machinery for intermittent operation as a booster source of power in conjunction with conventional marine propulsion machinery.

Gas turbine installations of hitherto known construction have for the most part been arranged to occupy separated engine compartments in nacelles and fuselages in aircraft use or front or rear end engine compartments separated from the passengers in passenger vehicle use. A marine use type of application for gas turbines poses somewhat a different problem in the matter of compartmentation in that the usual marine engine compartment has no isolated function separate and apart from the areas occupied by the operating personnel during operation of the engine or engines therein and the usual marine engine compartment is actually occupied by and operated directly through the efforts of personnel stationed therein when underway.

The blistering heat of the normal skin temperatures of gas turbine machinery presents certain readily appreciated but objectionable hazards in marine work for personnel who must have access thereto to service, maintain, and operate the machinery underway and most existing gas turbines are designed for other applications to which such hazards are foreign as in the case of aircraft and of vehicles previously referred to. It is therefore a primary object of the invention herein disclosed to provide a marine gas turbine in which the noted objections and hazards are avoided and to which a novel shrouding and gas stack arrangement contributes not only specifically to safe engine skin temperatures but also in general to a relatively quiet compact installation inherently having favorable sound directional characteristics with only a minimum need if any for the application of sound insulation material, having provision for favorable salt water spray removal from the induction air for the engine, and having a duct work for blanketing the engine with the cold induction air along its external surfaces.

According to one feature of the invention a novel marine engine compartment is provided with a set of orthodox port and starboard marine propulsion engines furnishing power for normal cruising speeds and straddling an interposed shrouded-and-air-blanketed booster engine of gas turbine construction which occupies a central location and provides power intermittently or as needed for making available higher effective propulsion power outputs when desired.

Another object of the invention is to provide, for the purpose of conducting intake and exhaust air between the atmosphere and a marine gas turbine disposed below decks in a vessel, a set of inner and outer concentric deck mounted stacks arranged with the inner stack connected to and receiving and discharging the exhaust gases from the turbine and with both stacks arranged with an annular space therebetween for admitting cold induction air to the turbine. According to one feature of the invention the cold induction air entirely envelopes the exterior of the turbine in traversing a path to the induction end of the latter. According to another feature spray traps are provided in the space between the stacks and in the path of the enveloping blanket of air flow about the engine to remove salt water and spray from the induction air. According to another feature of the invention, one or more spray nozzles are provided so as to protrude into the induction air path and introduce a spray of salt removing solvent into the air stream at intervals for cleaning out the working parts and passages in the turbine in which marine salt may tend to accumulate.

Another object of the invention is to provide a bearing supported rotatable gas turbine defining an internal gas flow path for hot motive fluid and enveloped by shrouding so as to be blanketed by a cool stream of combustion-supporting induction air, wherein there is a separate path for auxiliary atmospheric air through which the auxiliary air passes by natural effects due to being led into a low pressure area within the hot motive fluid path wherefrom it is pulled along in the stream of fluid and withdrawn owing to natural aspiration or eduction.

Further features, objects and advantages will either be specifically pointed out or become apparent when, for a better understanding of the invention, reference is made to the following written description taken in conjunction with the accompanying drawings in which:

Figures 1 and 2 are top plan and side elevational views respectively of a conventionallly propelled surface vessel having a gas turbine engine as a booster source power;

Figure 3 is a section in side elevation taken along the lines 3—3 of Figure 1 and showing the gas turbine engine in longitudinal section; and Figure 4 is an enlarged sectional view of a portion of the engine structure disclosed in Figure 1.

Illustrative of one environment to which the present invention is applicable, Figures 1 and 2 show a marine surface vessel or craft 10 of torpedo boat construction. The construction is such as to divide the craft into two or more compartments separated by appropriate transverse bulkheads, not shown, providing for water tight integrity and stability in the craft in conventional fashion. The thus compartmented torpedo boat 10 has a water tight hull 12 to which at the after end, there is mounted a series of three laterally spaced apart screws 14, 16 and 18, the middle one 16 of which is preferably located along the longitudinal center line of the boat indicated at 19 and conventionally with its axis in the vertical plane of the keel thereof. The screws 14 and 18 disposed at either side of the central screw 16 are preferably of the out-turning type; that is to say, in forward drive the screw 14 rotates in a counter-clockwise direction when viewed from the rear and the starboard screw 18 rotates in a clockwise direction when viewed from the rear during forward drive. Each of the three screws 14, 16 and 18 is carried by a propeller shaft 20 passing through a sealed stern tube 22 fitted to the bottom of the boat hull 12 and extending in an inclined direction forward and upwardly. The respective propeller shafts 20 for the port and starboard screws 14 and 18 are inclined to the horizontal at the same angle as the stern tubes 22 and are connected to a coupling 24 at their forward end which in turn is driven from an appropriate compound reduction gear box 26. A pair of axially aligned port diesel engines 28 is disposed back to back so as to include the port reduction gear box 26 therebetween and a pair of axially aligned starboard diesel engines 30 is disposed back to back so as to include the starboard reduction gear box 26 therebetween. Each of the engines 28, 30 is connected to the gearing within its respective reduction gear box 26 so as to share the load equally with its counterpart engine and each pair of engines on the port and starboard sides is disposed generally in the vertical plane of the propeller shaft 20 at that side and inclined at about the same common angle of inclination to the horizontal.

The central screw 16 and its propeller shaft 20 are driven by a gas turbine engine A having a pair of concentric stacks leading diagonally upwardly and rearwardly through a substantially horizontal upper deck 32 for the hull 12 which effectively covers over and closes off a bulkhead enclosed compartment 34 containing the respective pairs of port and starboard diesel engines 28, 30 and the engine A. The paired port engines 28 and starboard engines 30 operate in conventional fashion to furnish normal cruising power for the boat 10 whereas the gas turbine engine A is employed only intermittently as a booster for maximum or higher speed operation. The stack arrangement of the gas turbine engine A includes a pair of inner and outer generally concentric stack elements 36 and 38 both of which are hollow and define an included annular space 40 therebetween. A set of radially extending spacer struts 42, four in number, is provided for maintaining the radial spacing uniformly between the stacks 36 and 38 and also maintaining the included annular space 40 uniform in a circumferential or annular direction.

In Figure 3 particularly, the concentric stacks 36, 38 are shown to have a common axis 44 which is disposed in the vertical plane of the central propeller shaft 20 and which forms an acute angle B of approximately 50° with respect to the horizontal upper deck 32 which closes off the engine compartment 34; the inner one 38 of the two stacks has an end portion which extends in terms of its own diameter a distance of about ⅓ a diameter past the corresponding end of the outer stack 36. The pair of concentric stacks 36 and 38 pass through the upper deck 32 through an opening 46 which may be appropriately rendered water tight by application of the usual metal flashing or calking or both as appropriate. Within the engine compartment 34 the body of the gas turbine engine A is seen to be enclosed in an extension or envelope 48 connected to the outer stack 36 and forming a curved juncture therewith generally in the area 50, the lowermost end of the stack 36 having a gradually sweeping curve terminating at this general juncture area 50. At the forward end of the stack extension or envelope 48, an annular end wall 52 is provided which cooperates with an inturned complementary portion 54 mounted in closely spaced adjacency thereto to reverse the air flow and to define an induction entrance mouth 56 leading into an axial flow multi-stage compressor 58 for furnishing compressed air to the gas turbine engine A. A long cylindrical section of sheet metal 60 concentric with the compressor 58 carries the air reversing inturned portion 54 integral therewith and cooperates with the envelope 48 to define an included annular cylindrical chamber 62 forming a path for the induction air and communicating at one end with the annular space 40 between the stacks and communicating at the other end with the induction air inlet 56 for the compressor 58. The compressor 58 in operation is connected to and rotates synchronously with a gas generator shaft 64 which when driven by a compressor operating turbine wheel 66 causes induction air to be compressed and delivered into a flared annular chamber 68 for serving an annular row of circumferentially spaced apart can type burners 70. Each of the burners 70 is supplied by an individual tube inlet 72 leading from the annular chamber 68 and has a fuel spray nozzle 74 for spraying fuel into a perforated central flame tube 76 within the burner 70. An outer tube 78 forms a chamber about the flame tube 76 through which compressed induction air is fed through the perforations in the flame tube 76 and burns the fuel within the latter from the spray nozzle 74. The individual burners 70 which are preferably three or more in number, discharge at their downstream ends into a common annular chamber 80 in which a set of stationary nozzle vanes 82 is located for circumferentially spinning the gaseous body of motive combustion products from the burner 70 and directing the same against a set of gas turbine vanes 84 carried by the compressor driving turbine wheel 66.

The motive fluid is expanded somewhat in volume in passing through the vanes 84 of the compressor driving turbine 66 and is further expanded in a flared annular frusto conical passage 86 so as to increase the velocity of the motive fluid flow and direct the latter into a stationary nozzle chamber 88 for a propulsion or main drive turbine 90. The main drive turbine 90 has a single set of gas driven vanes or buckets 92 against which the expanded motive products impinge and from which is now spent motive gases are discharged into a diffuser section through a path indicated at 94 defined by the inside of the inner stack part 38 partly in cooperation with a curved beveled diffuser tail cone 96 disposed concentrically within and at the bottom of the stack 38. The effective expansion of the gases is effectively complete once they pass the vanes 92 such that before they enter the diffuser section these gases have substantially expanded to their lowest pressure and a mere diffuser action is all that is left to accomplish to complete their cycle. Thus the static pressure of the gases immediately leaving the vanes 92 is sub-atmospheric.

The propulsion or main turbine 90 is provided with a hollow drive shaft 98 which is separate from the shaft 64 for the compressor driving turbine and which leads rearwardly into a reduction gear box 100 which is of offset bull-gear construction and drives the propeller shaft 20 for the central screw 16 previously discussed. The hollow drive shaft 98 has a central axis of rotation 102 passing through the hollow interior thereof and disposed in the vertical plane of the central propeller shaft 20. The reduction gear box 100 is provided with a set of mounting lugs 104 with which it is mounted in common to a horizontal lower deck structure 106 the same as is the gas turbine engine A as by another set of mounting lugs one of which is shown at 108. A perforated frusto conical piece of sheet metal 110 is interposed in the induction air passage adjacent the junction area 50 and serves to permit the passage of induction air therethrough but at the same time screens out entrained droplets of salt water or spray carried by the induction air and forces them to collect at the outer periphery thereof at 112 where the frusto conical piece 110 is flange connected to the cylindrical metal envelope 48. The collected spray and salt water droplets thereafter drain circumferentially about the interior of the envelope 48 so as to accumulate in a shallow pool and pass through a spray removal drain pipe 114 provided adjacent the bottom of the sheet metal piece 110.

Adjacent the forward end of gas turgine engine A an annular gap or space of separation in the sheet metal may be provided at 116 to produce an additional exit for at least the heavier spray particles which tend to be slung outwardly due to centrifugal force when the induction air reverses its direction in passing from the chamber 62 into the entrance 56 for the compressor 58. Flow of a small portion of the stream of induction air through the gap 116 serves to accentuate this spray removal function and the spray tends to accumulate and collect in a chamber 118 served by a drain pipe 120 connected to the bottom thereof. Operating in conjunction with the spray removal apparatus which need not be too elaborate or 100% efficient as to salt water removal, a series of circumferentially spaced apart inlet duct injectors 122 may be provided for periodically spraying salt removing fluids such as mere fresh water into engine A which place the deposited salts and foreign matter in solution and permit them to be carried away in the stream of motive fluid coursing through the gas turbine engine A. An end plate 124 of disk shape is welded to the front sheet metal of the engine A and forms one side of the water droplet collecting chamber 118 so as to close off the front end of the gas turbine engine A. A blanket of sound deadening insulation fragmentarily indicated at 126 and 128 may be applied if desired to the exterior of the sheet metal envelope 48 in order to improve the sound directional qualities of the booster engine A and secondly to cover over the otherwise exposed outer surfaces of the engine A. These latter surfaces under normal operation have a skin temperature approximately equal to ambient temperature.

A lubricating oil supply pipe 130 disposed in the vicinity of the salt water trap 110 at the rear of the engine A extends transversely of the engine to a point of connection with a pressure lubricated outboard bearing 132 in which the hollow main turbine shaft 98 is set to rotate. The bearing 132 has an outer case 134 which is continually internally pressurized with lubricating oil and which is vented by a return or drain pipe 136 leading upwardly in a transverse direction across the engine to an oil collection sump, not shown. The bearing case 134 is supported within the tail cone structure 96 by means of a pair of horizontal streamlined struts 137 extending in opposite lateral directions transversely through the sides of the sheet metal cylinder about the turbine 90 to points of stationary securement and the bearing case 134 is centered by means of sheet metal spacer web 138 which is connected as by welding to the tail cone 96 at the relatively larger end of the latter.

The spacer web 138 which is perforated by radial slots formed as at 140 in its inner periphery is connected at an intermediate portion thereof to a cone shaped piece of sheet metal 142 cooperating therewith to define one end of a plenum chamber 144 for bearing cooling air. The opposite end of the bearing cooling plenum chamber is closed off by a disk of sheet metal 146 which is perforated by a set of radial slots 147 formed in its inner periphery so as to lead the cooling air into a relatively low pressure or sub-atmospheric area indicated at 148 and continuously communicating with the fluid path for the spent motive fluids in adjacency to the rear or discharge end of the main turbine buckets 92. The reason for the sub-atmospheric air condition prevailing at the rear of the buckets 92 is set forth in detail in a preceding paragraph of description of the buckets 92. The main turbine shaft 98 in cooperation with a stationary tubular sleeve 150 which is connected at its inner end to the cone 142 defines a cylindrical included path 152 for atmospheric air received from an annular opening 154 adjacent the reduction gear housing 100. The hollow stationary sleeve 150 and the hollow rotating shaft 98 both extend transversely across the annular induction air path 40, thence across the annular spent fluid path between the tail cone 96 and the inner stack 38, and then transversely across the tail cone 96 to the point of location of the bearing cooling plenum chamber 144. The flow of air through the path 152, 144, and 148 into the motive gas path behind the main turbine blades 92 is naturally induced owing to the pressure differential between the already noted sub-atmospheric pressure existing at the area 148 and the normal atmospheric pressure existing in the annular passage 154 adjacent the atmospheric air opening 154.

The gas turbine engine A has the forward portion thereof devoted to the compressor 58, to the burners 70, and to the compressor driving turbine 84 for the collective purpose of producing a gas generator. The gas turbine A has the rear portion thereof devoted to the prime power unit constituted by the main turbine 90 which utilizes the thus generated gases to provide driving torque through the main shaft 98 into the booster propulsion center shaft 20 and central screw 16.

In normal operation of the vessel of Figures 1 through 3, the tandem mounted pairs of port and starboard engines 28, 30 operate to supply cruising power for propelling the vessel through water and in the event excessive outputs and speed demands are made on the propulsion machinery the gas turbine engine A is placed in operation to provide additional bursts of power considerably in excess of the power otherwise available.

In the maintenance and occupancy of the engine compartment 34 by the boat's personnel during underway operation of the boat 10, the skin temperature maintained on the envelope 48 is intended to remain at a temperature approximately equal to the ambient temperature. Despite the excessive temperatures normally attributed to the operating temperatures of the motive fluid coursing through the gas turbine, this effect is accomplished due to the complete shrouding of the gas turbine engine A with a blanket of cool induction air which passes along the series connected annular passages 40, 62 and into the inlet 58 of the engine A. The blanket of cool air has the additional function of preventing the conduction of excessive amounts of unwanted sound from the relatively rapidly rotating blading and other equipment within the gas turbine engine A. The sound directional characteristics of the gas turbine booster unit A are further rendered favorable owing to the rearwardly upward discharge angle of the exhaust gases along the axis 44 from a position within and completely surrounded by the annular path 40 for conducting the cool induction air.

As herein disclosed the invention is shown embodied in a mobile marine vessel to produce a power boost at intermittent intervals. It is evident that many of the present advantages are to be realized in stationary marine installations and in the engine compartments of other type stationary and mobile installations both for intermittent and continual use. So also the drawing shows a pair of intake and exhaust stacks for the motive fluid and leading into and out of a decked over compartment wherein the stacks extend rearwardly and upwardly at a uniform diagonal angle of 50° with respect to the decks, but self-evidently a different diagonal angle may be utilized and broadly the stack axis, which may not necessarily be common to both stacks in every application, may extend vertically upward or normal with respect to the decks for one or both stacks or else extend diagonally forwardly relative to the decks. The propulsion machinery for the marine vessel herein appearing comprises first and second sets of one or more prime movers of which the booster turbine type prime movers of the first set are limited to one in number and are flanked or straddled by a second set of diesel type cruising prime movers which number two pairs and which are disposed with one pair at each side of and straddling the turbine, but indeed it is not essential to the invention that the foregoing proportion as to numbers is strictly adhered to and one or more cruising prime movers may be straddled by two or more booster type turbines and conceivably one booster type turbine may be straddled by more than two pairs of cruising engines or by a single pair of cruising engines one on each side in certain installations.

Variations within the spirit and scope of the invention described are equally comprehended by the foregoing description.

What is claimed is:

1. In combination, a generally horizontally disposed tubular envelope for fresh air having an angularly related intake stack portion joined thereto at one end and having a reversely bent internally received portion joined thereto at the opposite end, prime power means within the envelope defining a flow path for motive fluid and connected to the reversely bent portion to receive fresh air therefrom, an exhaust stack concentrically received within the intake stack portion and connected to the prime power means for conducting spent motive fluid away therefrom, said envelope and the intake stack portion thereof being radially spaced apart from the respective exhaust stack and prime power means to define an annular path for a continually provided blanket of air surrounding the exhaust stack and the prime power means, water separator means intersecting the air path at at least one of the junctures between the envelope and its end portions, said prime power means having a rotor carrying load shaft and a supporting bearing therefor, a fresh air conducting tube connected to the atmosphere at its outer end and together with the load shaft protruding diagonally inwardly through the walls of the envelope and the exhaust stack to the common vicinity of the support bearing and the prime power means, and means including the exterior of the bearing forming a path for conducting cooling air from the tube across the bearing into a low pressure area of discharge into the motive fluid path.

2. In combination, a generally horizontally disposed tubular envelope for induction air having an angularly related intake stack portion joined thereto at one end and having a reversely bent internally received portion joined thereto at the opposite end, dual turbine means within the envelope defining a flow path for motive fluid and connected to the reversely bent portion to receive induction air therefrom for supporting combustion, an exhaust stack concentrically received within the stack portion and having one end extending beyond the corresponding end of the intake stack portion and the opposite end connected to the dual turbine means for receiving spent motive fluid therefrom, said envelope and the intake stack portion thereof being radially spaced apart from the exhaust stack and dual turbine means to define an annular path for a continually provided blanket of induction air surrounding the exhaust stack and the dual turbine means, water separator means intersecting the induction air path at at least one of the junctures between the envelope and its end portions, said dual turbine means having a rotor carrying load shaft driven by one of the turbines thereof and having a supporting bearing, means of communication connected to the atmosphere and together with the load shaft extending transversely through the envelope and disposed with one end in the vicinity of the support bearing and the said turbine in the dual turbine means, and means including the exterior of the bearing forming a path for conducting atmosphere-supplied cooling air from the means of communication across the bearing into a low pressure area of discharge into the spent motive fluid path.

3. In combination, a generally horizontally disposed tubular envelope for fresh air having a diagonally related stack portion joined thereto at an obtuse angle at one end and having a reversely bent internally received portion joined thereto at the opposite end, prime power means within the envelope defining a flow path for motive fluid and connected to the reversely bent portion to receive fresh air therefrom, an exhaust stack concentrically received within the stack portion and connected to the prime power means for conducting spent motive fluid away therefrom, said envelope and the stack portion thereof being radially spaced apart from the exhaust stack and prime power means to define an annular path for a continually provided blanket of air surrounding the exhaust stack and the prime power means, spray introducing and spray removing devices at either end of said horizontally disposed tubular envelope and intersecting the air path adjacent a corresponding juncture between the envelope and its end portions, said prime power means having a rotor carrying load connected shaft and a supporting bearing therefor, a cooling air conducting jacket concentrically surrounding the load shaft, said jacket being connected to the atmosphere and together with the load shaft extending transversely through the envelope and disposed with one end in the vicinity of the support bearing and the prime power means, and means including the exterior of the bearing forming a path for conducting cooling air from the jacket across the bearing into a subatmospheric pressure area in the motive fluid path.

4. In combination, a generally horizontally disposed cylindrical envelope for induction air having an intake stack portion at one end and having an air reversing bent portion internally received at the opposite end, dual turbine means within the envelope defining a flow path for motive fluid and connected to the air reversing bent portion of the envelope to receive induction air therefrom for generating hot motive fluid, said envelope being radially spaced apart from the dual turbine means therewithin to define an annular path for a continually provided blanket of induction air surrounding the latter, said dual turbine means having a rotor carrying load shaft driven by one of the turbines thereof and having a supporting bearing, said one turbine adapted to be driven by motive fluid and having an exhaust path in which to discharge spent motive fluid, means of communication connected to the atmosphere and concentrically together with the load shaft extending transversely through the envelope and disposed with one end in the vicinity of the support bearing and the said one turbine in the dual turbine means, and means including the exterior of the bearing forming a path for conducting atmosphere supplied cooling air from the means of communication across the bearing into a low pressure area of discharge in the spent motive fluid path aforesaid.

5. In combination, annular sheet metal members cooperatively defining multiple gas path casing structure and characterized by a substantially straight body portion and companion stack portions extending generally diagonally with respect to the straight body portion, said stack portions being concentric to one another, a rotating source of prime gas power received in the casing structure in the location of the straight body portion, propeller connected gear reduction means disposed externally of said annular members in the area of the juncture between each of the diagonal end portions and said straight body portion of the casing structure, a tubular shaft part connected to the gear reduction means and to said prime power source and having a support bearing therefor adjacent the latter, and a tubular sleeve part concentrically disposed about the tubular shaft part and together therewith defining an annular air path open at one end to the atmosphere and having an inner end arranged to deliver cooling air to the shaft bearing, the axes of said concentric tubular parts and said concentric stack portions being diagonally related to one another.

6. In combination, a plurality of annular sheet metal members cooperatively defining multiple concentric flow path structure and characterized by a substantially straight body portion and companion end portions concentric to one another, and extending generally diagonally with respect to the straight body portion, a rotating source of prime power received in the flow casing structure in the location of the straight body portion, speed reducing means disposed externally of said annular members in the area of the juncture between each of the diagonal end portions and said straight body portion of the casing structure, first and second parts concentrically arranged one within the other with an annular space between and passing consecutively through the sides of at least three annular members aforesaid, said first part comprising a bearing-supported drive shaft connected between the prime power source and the speed reducing means, and said second part being stationary with respect to the first part and arranged such that the included annular space therebetween communicates with the atmosphere adjacent the speed reducing means and delivers a stream of cooling air to a drive shaft support bearing adjacent the source of prime power.

References Cited in the file of this patent

UNITED STATES PATENTS

| | | |
|---|---|---|
| 227,535 | Irwin | May 11, 1880 |
| 1,276,154 | Zoelly | Aug. 20, 1918 |
| 1,774,295 | Smallhouse | Aug. 26, 1930 |

(Other references on following page)

UNITED STATES PATENTS

| | | |
|---|---|---|
| 2,121,319 | Fluor et al. | June 21, 1938 |
| 2,186,706 | Martinka | Jan. 9, 1940 |
| 2,474,068 | Sammons et al. | June 21, 1949 |
| 2,511,130 | Sedille et al. | June 13, 1950 |
| 2,604,277 | Anxionnaz et al. | June 22, 1952 |
| 2,611,599 | MacCracken | Sept. 23, 1952 |
| 2,613,498 | Prendergast | Oct. 14, 1952 |
| 2,670,912 | Lindsey et al. | Mar. 2, 1954 |
| 2,711,683 | Ryder | June 28, 1955 |

FOREIGN PATENTS

| | | |
|---|---|---|
| 12,615 | Great Britain | June 9, 1896 |
| 565,176 | Great Britain | Oct. 31, 1944 |
| 600,228 | Great Britain | Apr. 2, 1948 |
| 618,760 | Great Britain | Feb. 25, 1949 |
| 620,820 | Great Britain | Mar. 30, 1949 |
| 622,768 | Great Britain | May 6, 1949 |